United States Patent
Jung et al.

(10) Patent No.: US 10,602,568 B2
(45) Date of Patent: Mar. 24, 2020

(54) DELINKING METHOD IMPLEMENTED BY UE IN WIRELESS COMMUNICATION SYSTEM, AND UE USING SAID METHOD

(71) Applicant: LG ELECTRONICS INC., Seoul (KR)

(72) Inventors: Sunghoon Jung, Seoul (KR); Jaewook Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 59 days.

(21) Appl. No.: 15/576,415

(22) PCT Filed: May 26, 2016

(86) PCT No.: PCT/KR2016/005592
§ 371 (c)(1),
(2) Date: Nov. 22, 2017

(87) PCT Pub. No.: WO2016/190687
PCT Pub. Date: Dec. 1, 2016

(65) Prior Publication Data
US 2018/0152986 A1    May 31, 2018

Related U.S. Application Data

(60) Provisional application No. 62/166,143, filed on May 26, 2015, provisional application No. 62/166,581, filed on May 26, 2015.

(30) Foreign Application Priority Data

May 26, 2016    (KR) ........................ 10-2016-0065069

(51) Int. Cl.
*H04W 76/30* (2018.01)
*H04W 48/20* (2009.01)
(Continued)

(52) U.S. Cl.
CPC ........... *H04W 76/30* (2018.02); *H04W 48/20* (2013.01); *H04W 76/10* (2018.02); *H04W 76/27* (2018.02); *H04W 48/02* (2013.01); *H04W 88/04* (2013.01)

(58) Field of Classification Search
CPC ..... H04W 76/10; H04W 76/27; H04W 76/30; H04W 48/20
See application file for complete search history.

(56) References Cited

U.S. PATENT DOCUMENTS

2010/0329148 A1* 12/2010 Won ................... H04B 7/15557
                                                                370/254
2012/0082105 A1*  4/2012 Hwang ................. H04W 76/30
                                                                370/329
(Continued)

FOREIGN PATENT DOCUMENTS

GB        2482716 A      2/2012
KR    1020090114018    11/2009
(Continued)

OTHER PUBLICATIONS

Intel Corporation, "Considerations on EU-to-NW Relay for ProSe", 3GPP TSG RAN WG2 Meeting #89bis, Apr. 20-24, 2015, R2-151111.
(Continued)

*Primary Examiner* — Ricky Q Ngo
*Assistant Examiner* — Stephen N Steiner
(74) *Attorney, Agent, or Firm* — Dentons US LLP

(57) ABSTRACT

Provided are a delinking method implemented by a remote UE in a wireless communication system, and a device using said method. The method is characterized by: receiving a disconnect message for disconnecting a link between a relay UE and the remote UE; disconnecting the link on the basis (Continued)

of the disconnect message; and not attempting to establish a link between the remote UE and the relay UE in a UE-specified time section.

8 Claims, 21 Drawing Sheets

(51) Int. Cl.
*H04W 76/27* (2018.01)
*H04W 76/10* (2018.01)
*H04W 48/02* (2009.01)
*H04W 88/04* (2009.01)

(56) References Cited

U.S. PATENT DOCUMENTS

2016/0088668 A1* 3/2016 Kim .................. H04W 48/16
 370/315
2018/0124674 A1* 5/2018 Vutukuri ............... H04W 36/30

FOREIGN PATENT DOCUMENTS

| KR | 101260889 | 5/2013 |
| KR | 1020150022240 | 3/2015 |
| WO | 2011118997 A2 | 9/2011 |

OTHER PUBLICATIONS

3GPP TS 36.304 V8.5.0, Mar. 2009.
LG Electronics, "UE-to-Network Relay release Procedure," S2-151613, SA WG2 Meeting #109, May 19, 2015, see pp. 1-2, 6 and figures 1-2, 7.2.2.x.1.

\* cited by examiner

DELINKING METHOD IMPLEMENTED BY UE IN WIRELESS COMMUNICATION SYSTEM, AND UE USING SAID METHOD

CROSS-REFERENCE TO RELATED APPLICATIONS

This application is the National Stage filing under 35 U.S.C. 371 of International Application No.PCT/KR2016/005592, filed on May 26, 2016, which claims the benefit of U.S. Provisional Applications No. 62/166,143 filed on May 26, 2015, No. 62/166,581 filed on May 26, 2015, and Korean Patent Application No. 10-2016-0065069 filed on May 26, 2016, the contents of which are all hereby incorporated by reference herein in their entirety.

BACKGROUND OF THE INVENTION

Field of the Invention

The present invention relates to wireless communication, and more particularly, to a method of releasing a link, performed by a user equipment (UE) in a wireless communication system, and the UE using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

The D2D operation is also referred to as a Proximity Service (ProSe) operation in a sense that a signal is transmitted/received between adjacent devices, and may have various advantages. For example, D2D UE may perform data communication with a high transfer rate and a low delay. Furthermore, in D2D operation, traffic concentrated on a base station can be distributed. If D2D UE plays the role of a relay, it may also play the role of extending coverage of a base station.

The D2D UE may also operate as a UE which plays a role of a relay for connecting a sidelink and a cellular link. That is, the D2D UE may operate as a relay UE. The relay UE may play a role of a relay between a specific UE and a network. In this case, the specific UE may be referred to as a remote UE.

Meanwhile, after the relay UE and the remote UE establish a connection, it may be necessary to release the connection. For example, there is a case where a quality of service provided by the relay UE becomes worse or the relay UE needs to preferentially provide a relay service for a different UE. As such, if there is a need to release a link between the relay UE and the remote UE, it may be necessary to specify which method will be used to release the link.

SUMMARY OF THE INVENTION

The present invention provides a method of releasing a link, performed by a user equipment (UE) in a wireless communication system, and the UE using the method.

In one aspect, provided is a method of releasing a link performed by a remote user equipment (UE) in a wireless communication system. The method includes receiving a connection release message for releasing a link between a relay UE and the remote UE and releasing the link on the basis of the connection release message. The remote UE does not attempt to establish a link for the relay UE in a time duration determined in a UE specific manner.

In the time duration, the remote UE may do not attempt to establish the link for the relay UE by excluding the relay UE from a candidate relay UE.

The time duration may be a value configured autonomously by the remote UE.

A connection release accept message may be transmitted to the relay UE in response to the connection release message.

The connection release message may comprise information indicating that communication between the relay UE and the remote UE is no longer allowed.

Upon receiving the connection release message comprising the information, it may be not attempted to establish the link for the relay UE during the time duration.

Upon receiving the connection release message comprising the information, the remote UE may do not attempt to establish the link for the relay UE by excluding the relay UE from a candidate relay UE during the time duration.

The link between the relay UE and the remote UE may be a sidelink which uses a PC5 interface.

In another aspect, provided is a user equipment (UE). The UE includes a radio frequency (RF) unit for transmitting and receiving a radio signal and a processor operatively coupled to the RF unit. The processor is configured for: receiving a connection release message for releasing a link between a relay UE and the UE and releasing the link on the basis of the connection release message. The processor does not attempt to establish a link for the relay UE in a time duration determined in a UE specific manner.

After a remote user equipment (UE) and a relay UE establish a link connection, it may be necessary to release the link connection for various reasons. The present invention provides a method of releasing the link connection between the remote UE and the relay UE. Since the remote UE is allowed not to attempt a reconnection during a specific time with respect to the connection-released relay UE, a ping pong phenomenon can be prevented from occurring between the relay UE and the remote UE.

DESCRIPTION OF EXEMPLARY EMBODIMENTS

Figure 1:
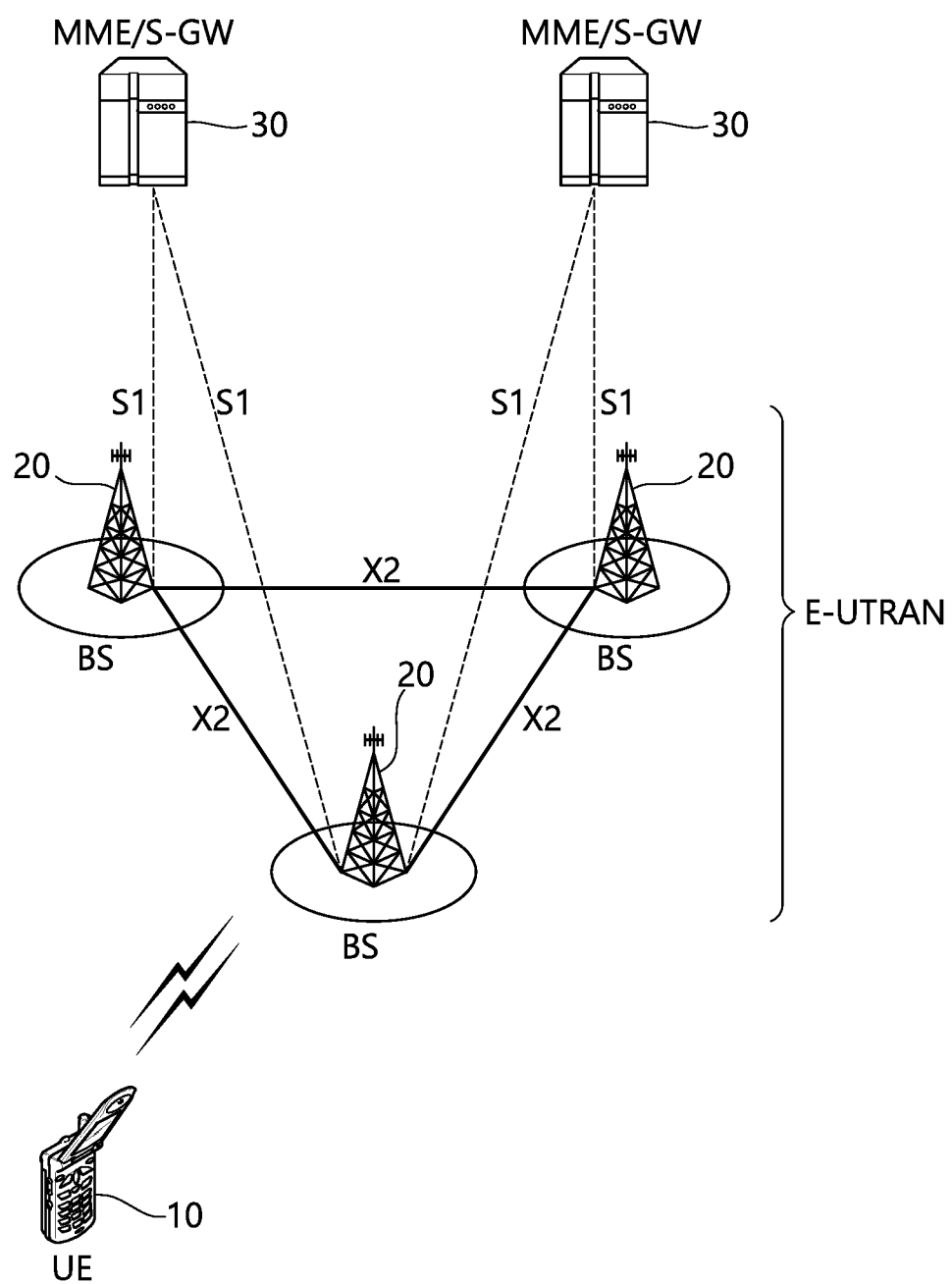
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
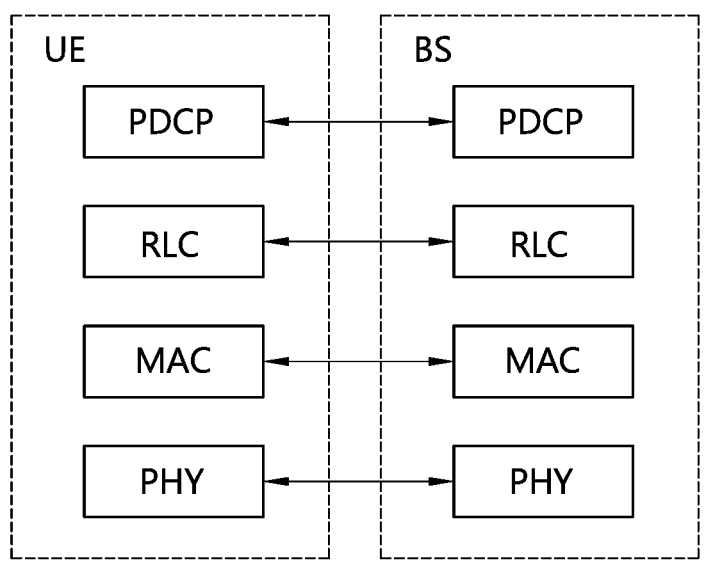
FIG. 2 is a diagram showing a wireless protocol architecture for a user plane.
Figure 3:
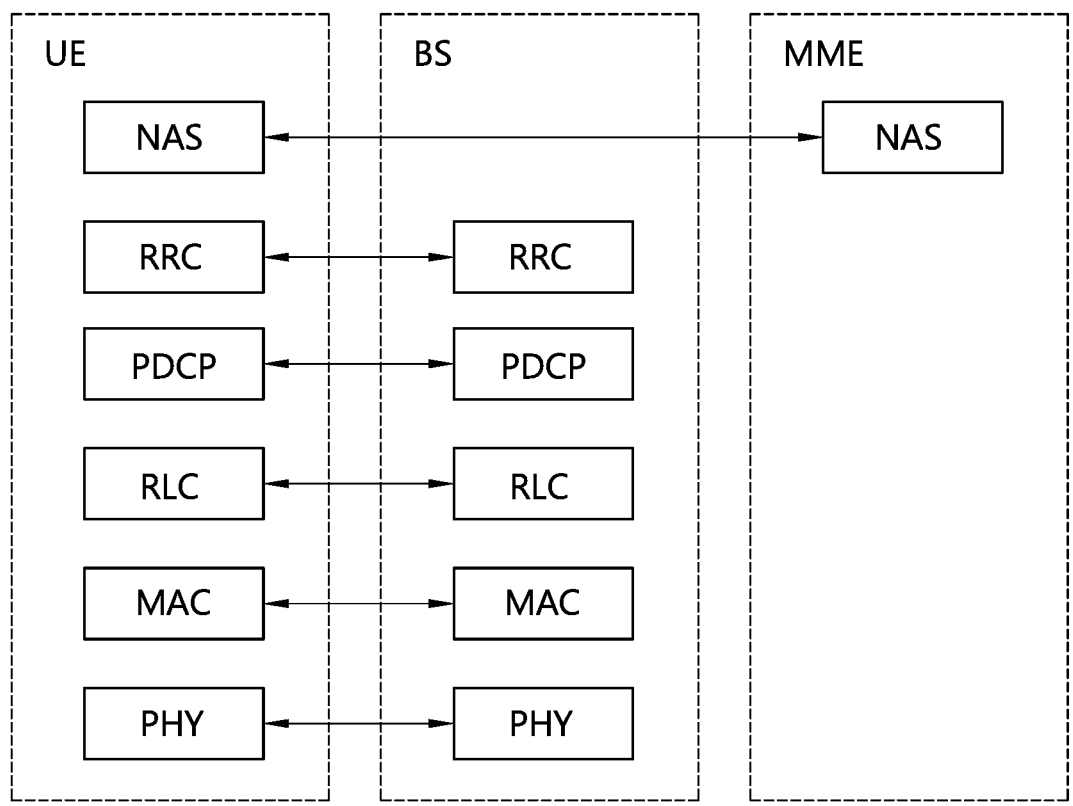
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
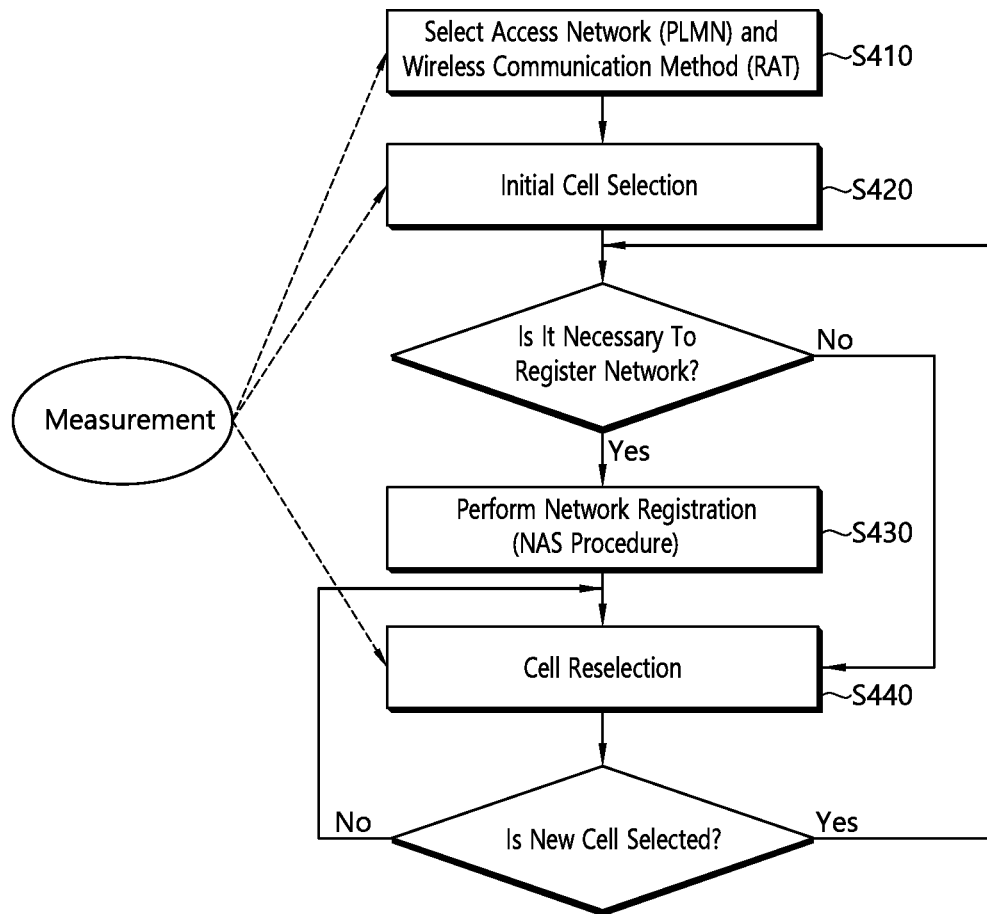
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
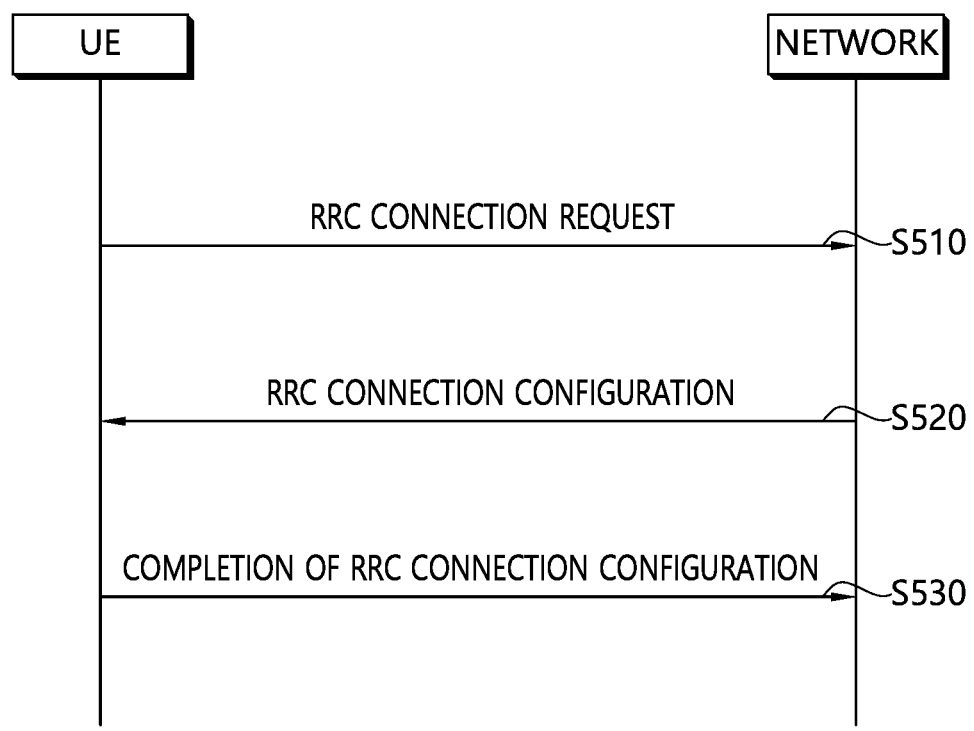
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
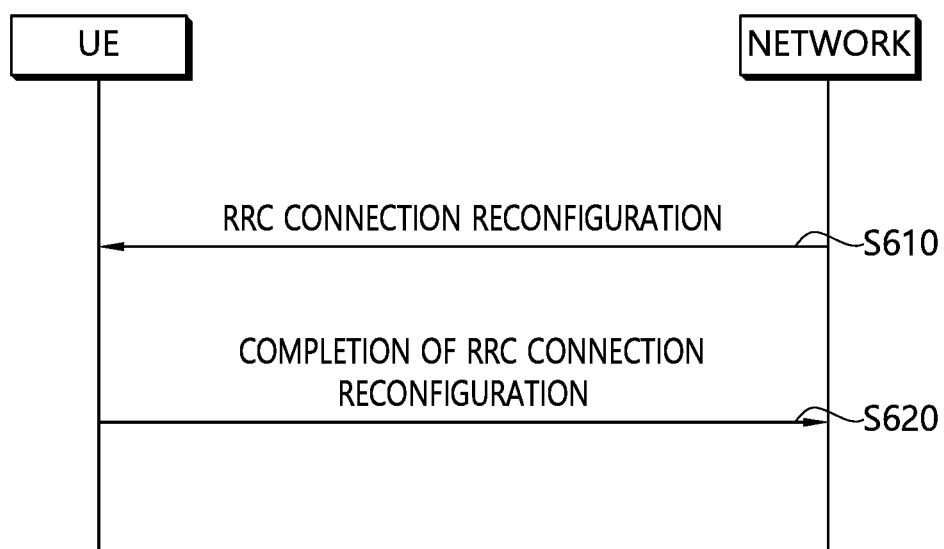
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC).

Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

Srxlev>0 AND Squal>0 where:

Srxlev=$Q_{rxlevmeas}-(Q_{rxlevmin}+Q_{rxlevminoffset})-P$compensation

Squal=$Q_{qualmeas}-(Q_{qualmin}+Q_{qualminoffset})$ [Equation 1]

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$Rs=Q$meas,s$+Q$hyst,$Rn=Q$meas,s$-Q$offset [Equation 2]

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset= Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
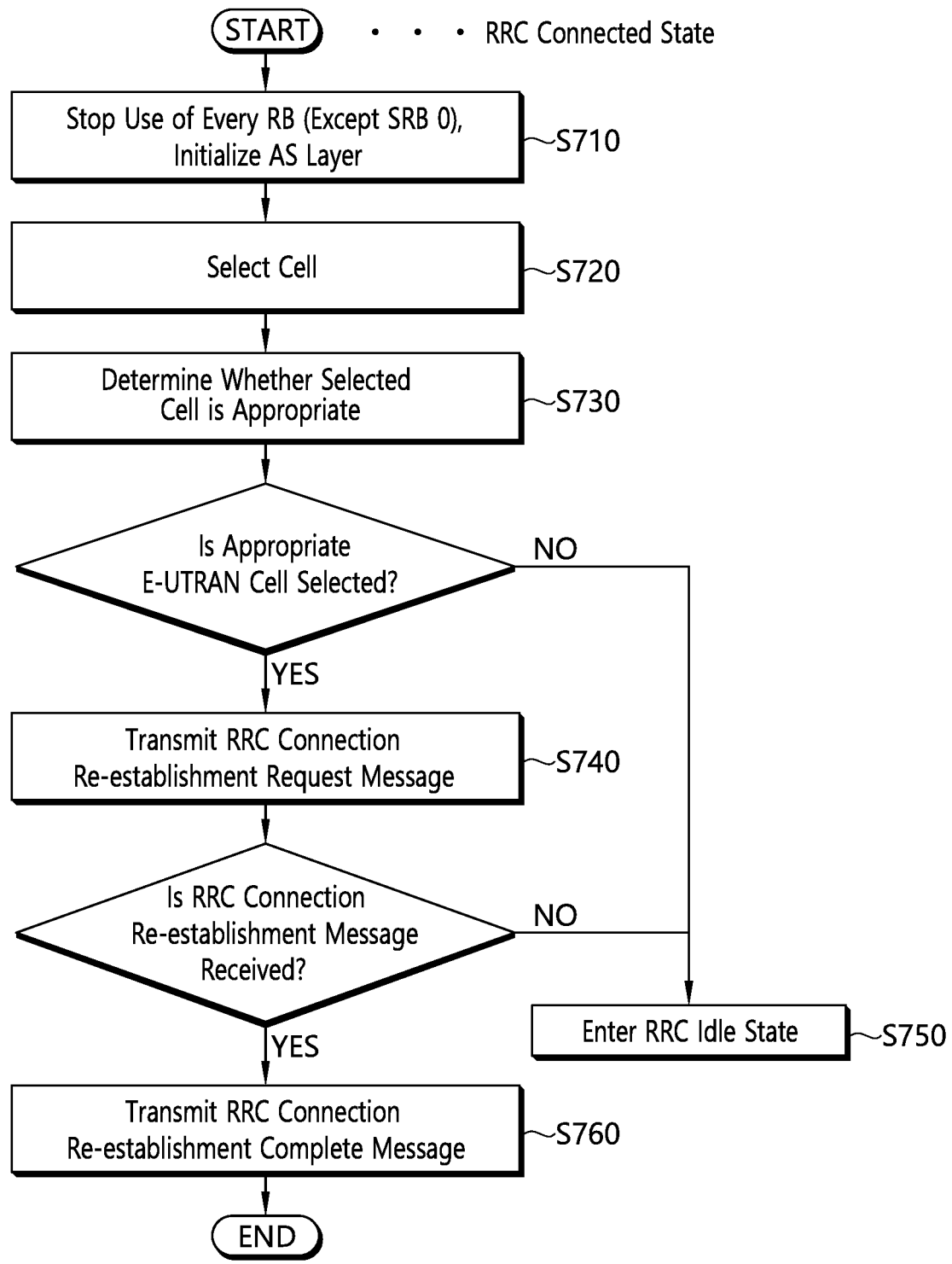
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
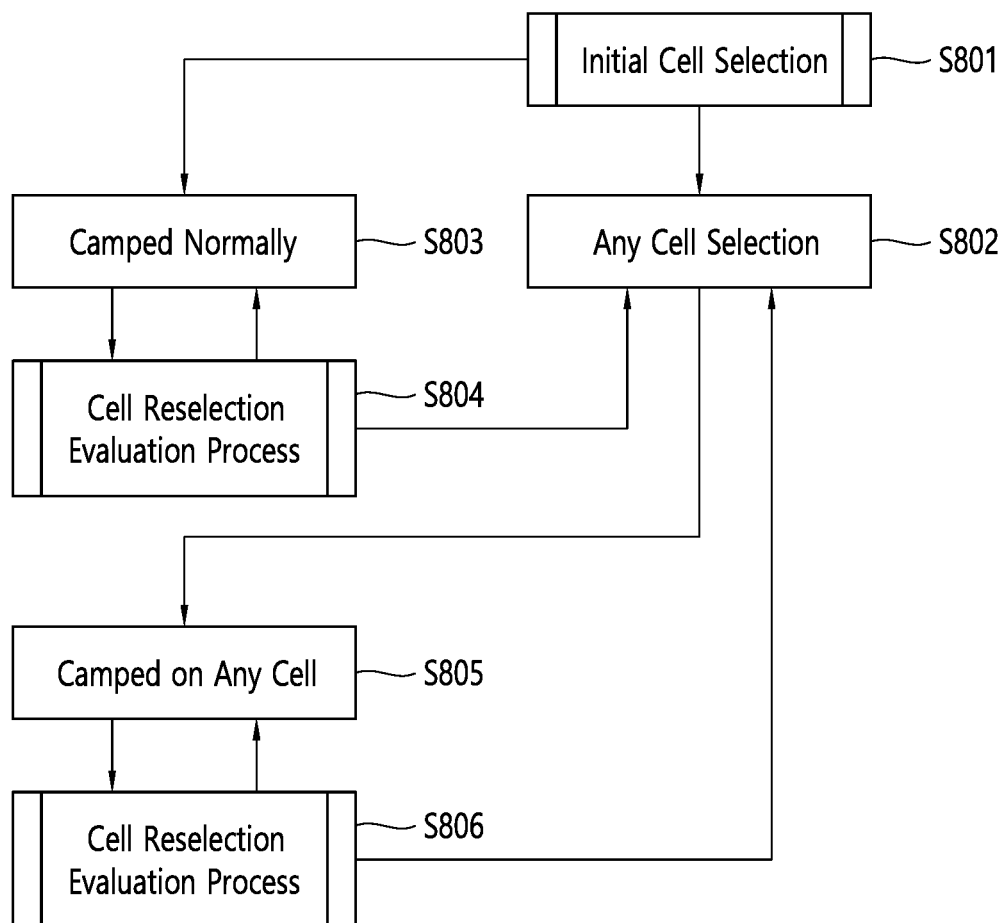
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
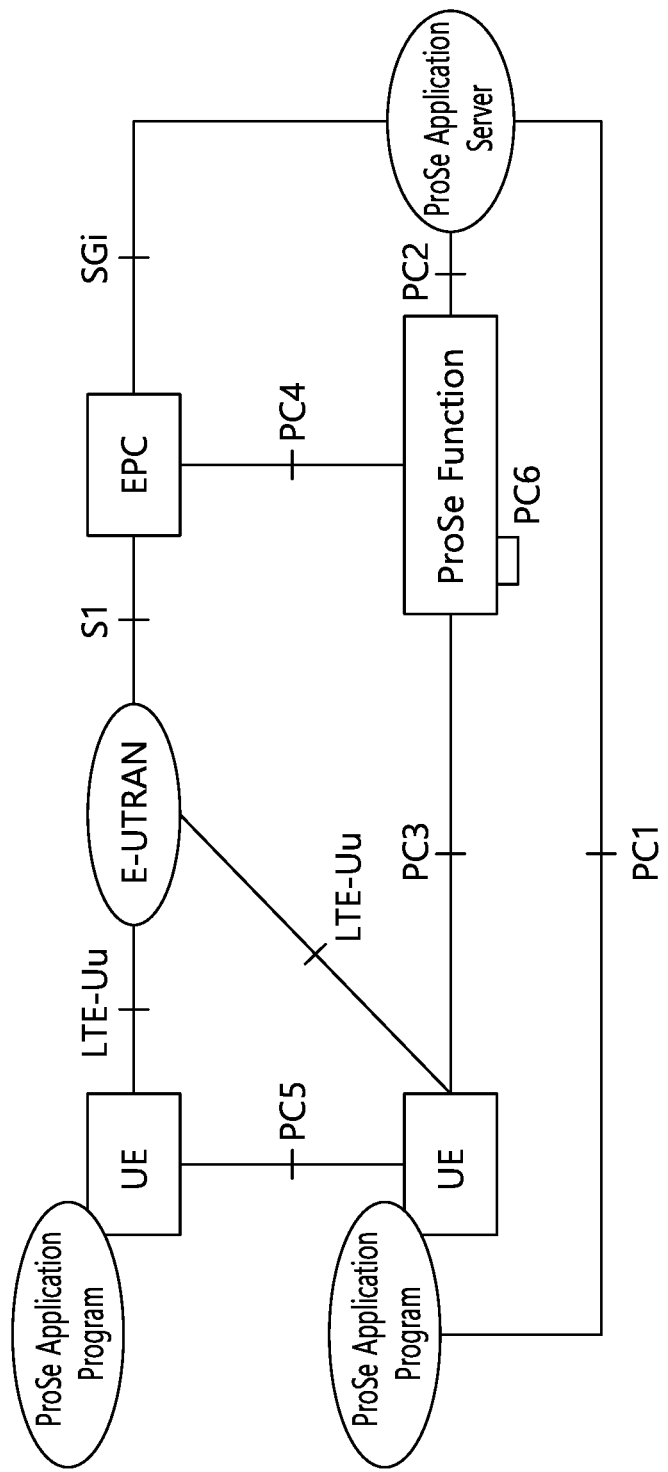
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.
  Interworking via a reference point toward the 3rd party applications
  Authorization and configuration of UE for discovery and direct communication
  Enable the functionality of EPC level ProSe discovery
  ProSe related new subscriber data and handling of data storage, and also handling of the ProSe identities
  Security related functionality
  Provide control towards the EPC for policy related functionality
  Provide functionality for charging (via or outside of the EPC, e.g., offline charging)

A reference point and a reference interface in the basic structure for ProSe are described below.
  PC1: a reference point between the ProSe application program within the UE and the ProSe application program within the ProSe APP server. This is used to define signaling requirements in an application dimension.
  PC2: a reference point between the ProSe APP server and the ProSe function. This is used to define an interaction between the ProSe APP server and the ProSe function. The update of application data in the ProSe database of the ProSe function may be an example of the interaction.
  PC3: a reference point between the UE and the ProSe function. This is used to define an interaction between the UE and the ProSe function. A configuration for ProSe discovery and communication may be an example of the interaction.
  PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.
  PC5: a reference point used for using control/user plane for discovery and communication, relay, and 1:1 communication between types of UE.
  PC6: a reference point for using a function, such as ProSe discovery, between users belonging to different PLMNs.
  SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
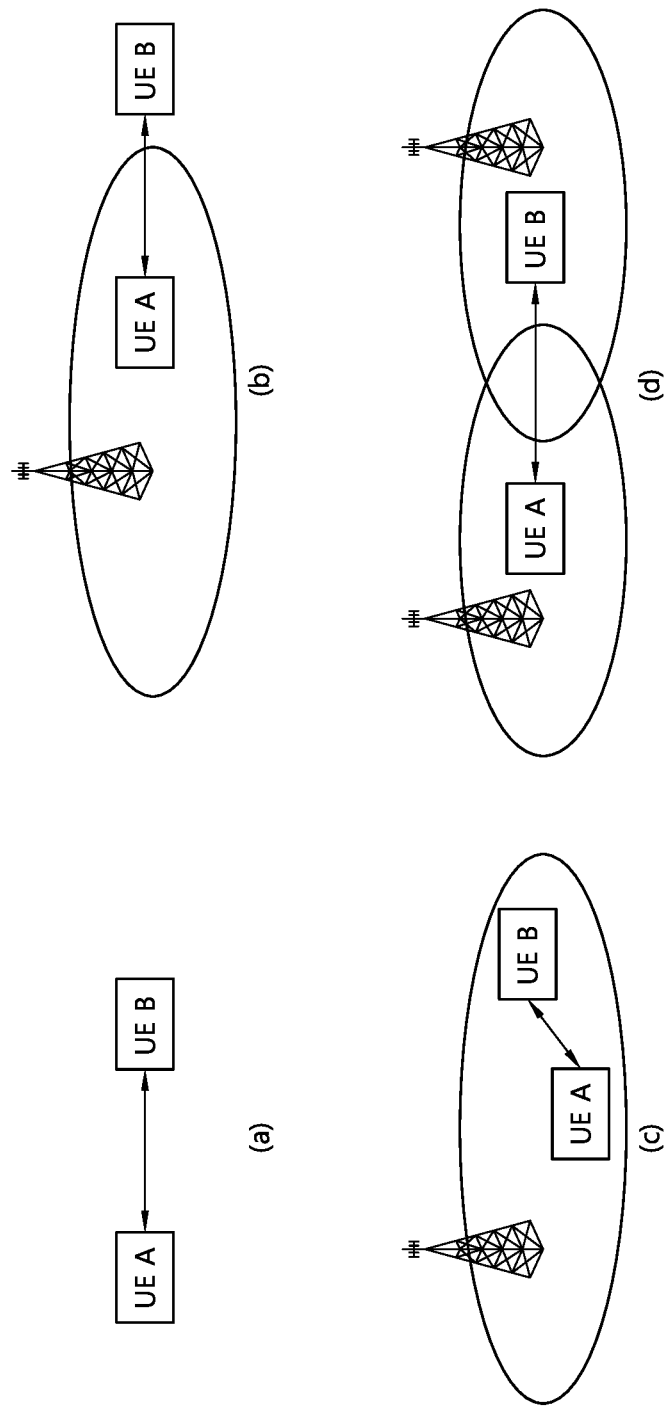
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
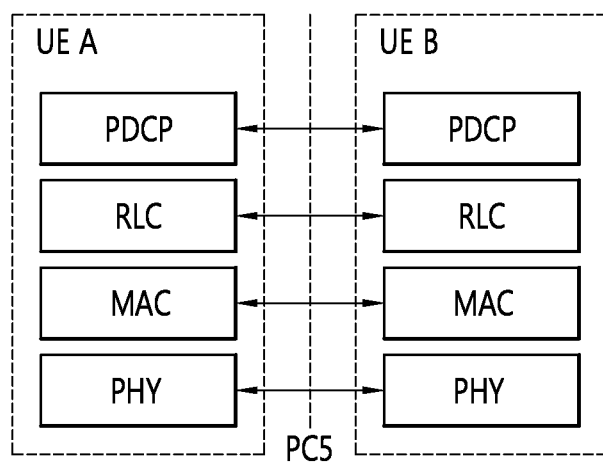
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
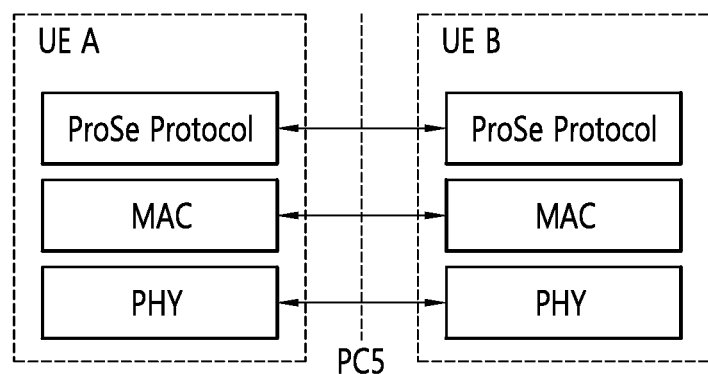
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

As a method in which resources for announcement of discovered information are allocated not specifically to a terminal, a base station provides a resource pool configuration for announcement of the discovered information to terminals. The configuration is included in a system information block (SIB) to be signaled by a broadcast scheme. Alternatively, the configuration may be provided while being included in a terminal specific RRC message. Alternatively, the configuration may be broadcast signaling of another layer except for an RRC message or terminal specific signaling.

The terminal autonomously selects the resource from an indicated resource pool and announces the discovery information by using the selected resource. The terminal may announce the discovery information through an arbitrarily selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Hereinafter, a sidelink may imply a UE-to-UE interface for a D2D communication and a D2D discovery. The sidelink corresponds to the aforementioned PC5 interface. A channel defined/used in the sidelink may be a physical sidelink control channel (PSCCH), and a control channel for broadcasting basic system information for D2D communication may be a physical sidelink broadcast channel (PSBCH). In addition, a channel for transmitting a D2D discovery signal may be defined as a physical sidelink discovery channel (PSDCH). A D2D synchronization signal may be referred to as a sidelink synchronization signal (SLSS) or a D2D synchronization signal (D2DSS).

In an LTE-A system (Rel-12, 13, or more), a D2D communication UE is configured to transmit the PSBCH and the SLSS together or to transmit the SLSS. In addition, in the LTE-A system, a sidelink RSRP (S-RSRP) is newly defined to adjust synchronization with a different UE in the D2D communication. That is, when UEs intend to perform the D2D communication, the D2D communication may be performed in such a manner that the S-RSRP is measured to perform the D2D communication by adjusting synchronization only for UEs of which the S-RSRP is greater than or equal to a specific value. In this case, the S-RSRP may be measured from a demodulation reference signal (DM-RS) on the PSBCH. However, for a D2D relay operation, the S-RSRP may be measured from a DM-RS on the PSDCH. Meanwhile, for the D2D relay operation, sidelink discovery reference signal received power (SD-RSRP) may be used. The SD-RSRP may be defined as a linear average of power contribution of resource elements for carrying a DM-RS associated with a PDSCH of which a cyclic redundancy check (CRC) is authenticated. A reference point of the SD-RSRP may be an antenna connection portion of the UE. When reception diversity is used by the UE, a value lower than the SD-RSRP depending on an individual diversity branch may not be reported.

In addition, a UE located out-coverage of a cell may measure the S-RSRP/SD-RSRP or the like on the basis of the SLSS and/or the DM-RS of the PSBCH/PSCCH/PSSCH to determine whether the UE will be a synchronization source for performing a D2D relay operation.

Hereinafter, the D2D relay operation is also simply referred to as a relay operation, and a UE for performing the D2D relay operation is referred to as a relay UE. The relay UE may be located between a first UE and a second UE to relay a signal between the first and second UEs. Alternatively, the relay UE may be located between a different UE and a network (cell/eNB) to relay a signal between the different UE and the network. Hereinafter, it is assumed that the relay UE is a UE for relaying a signal between the different UE and the network.

Figure 13:
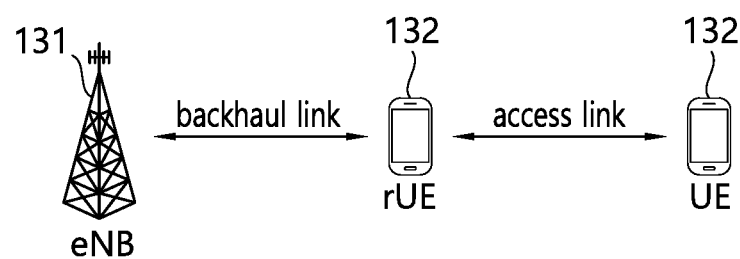
FIG. 13 shows an example of a relay UE.

FIG. 13 shows an example of a relay UE.

A relay UE 132 is a UE for providing network connectivity to a remote UE 133. The relay UE 132 plays a role of relaying a signal between the remote UE 133 and a network 131. The remote UE 133 may be a UE which is located out-of-coverage of an eNB or has a difficulty in performing direct communication with the eNB even if it is located in-coverage.

While maintaining not only a link with the eNB but also a link with a normal UE (e.g., remote UE), the relay UE may deliver information received from the eNB to the normal UE or may deliver information received from the normal UE to the eNB. In this case, a link between the eNB and the relay UE may be referred to as a backhaul link, and a link between the relay UE and the remote UE may be referred to as an access link. The link between the relay UE and the remote UE may be referred to as a sidelink, a direct link, or a D2D link in a sense that it is a UE-to-UE interface, and may be referred to as a relay link in a sense that it is associated with a relay of a signal.

Figure 14:
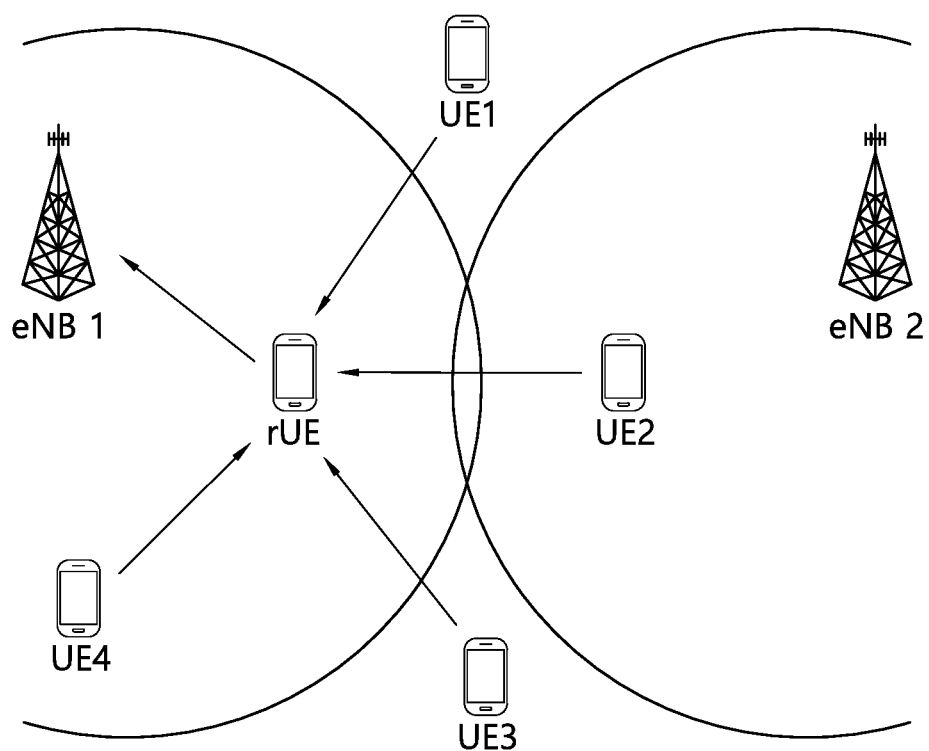
FIG. 14 shows an example of a relation between a relay UE and a remote UE.

FIG. 14 shows an example of a relation between a relay UE and a remote UE.

In FIG. 14, a UE1 and a UE3 are out-coverage UEs, a UE2 and a UE4 are in-coverage UEs, and an rUE is a relay UE configured to perform a relay operation. Herein, the UE2 corresponds to an in-coverage UE as to an eNB2, but may correspond to an out-coverage UE as to an eNB1. As to the rUE, the eNB1 may be a serving cell.

The rUE is a UE configured as a rUE by an instruction of the eNB1 or a coordination between rUEs or the like. Since the rUE broadcasts a discovery signal or the like, neighboring UEs may know in advance a presence of the rUE. For uplink transmission, the rUE may receive a D2D signal from a UE (i.e., UE4) in a network of a serving cell, a UE (i.e., UE2) in a network of a neighboring cell, and out-coverage UEs (i.e., UE1, UE3).

Hereinafter, a process in which a remote UE selects a relay UE is described in detail. In addition, when the remote UE selects the relay UE, which operation/process will be performed in protocol layers of the remote UE is described.

The process in which the remote UE selects the relay UE may roughly include three steps, and RAN assistant information and control information having a different level may be provided for each step. The remote UE may be located in-coverage of an eNB or may be located out-of-coverage of the eNB. A level controlled by the eNB may be affected according to where the remote UE is located.

Figure 15:
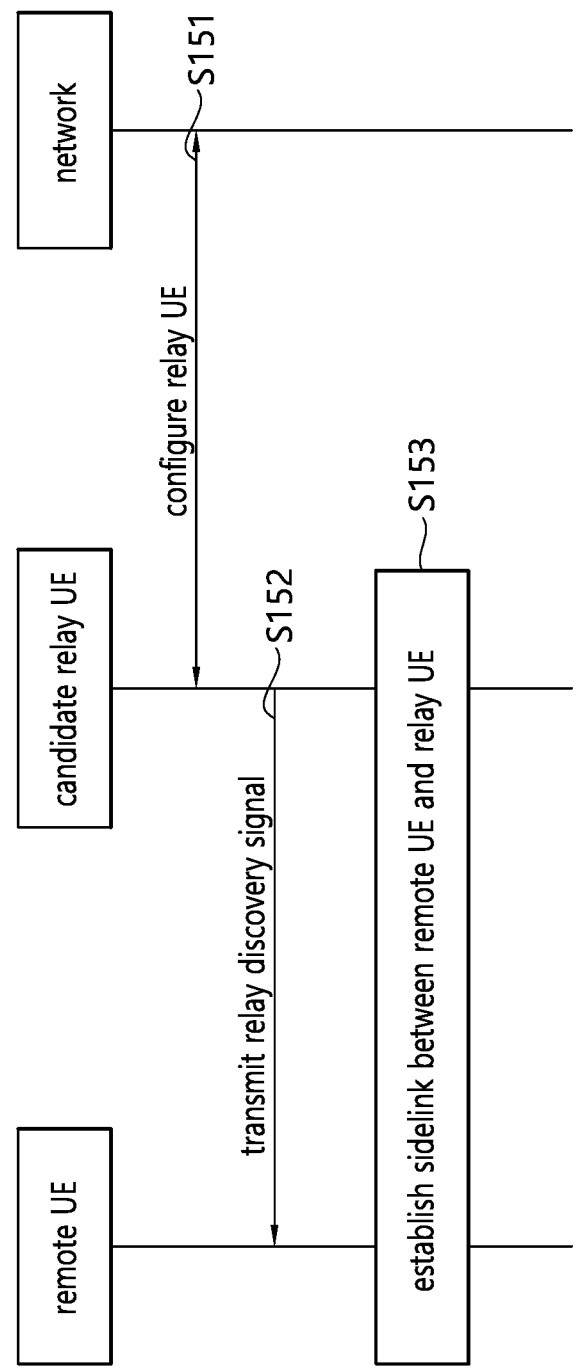
FIG. 15 shows an example of three steps in which a remote UE selects a specific UE as a relay UE from candidate relay UEs.

FIG. 15 shows an example of three steps in which a remote UE selects a specific UE as a relay UE from candidate relay UEs.

Referring to FIG. 15, a relay UE is configured between a candidate relay UE and a network (S151). This may be referred to as a step 1: configuration of relay UE.

In order for the candidate relay UE to participate in a discovery operation and to perform a relay operation between the remote UE and the network, it may be necessary to authenticate the candidate relay UE as a UE which plays a role of a relay from the remote UE to the network. Accordingly, the candidate relay UE may need to enter an RRC_connected state so as to be allowed to operate as a relay UE by the network (eNB).

In addition, there are two types of methods applicable to a discovery transmitted by the relay UE (this is referred to as a relay discovery). That is, there may be a relay discovery transmission initiated by the relay UE and a relay discovery transmission initiated by the remote UE. Which one will be used between the two types of methods may be configured/controlled by the eNB.

That is, in order for the relay UE to participate in the relay discovery and to play a role of a relay between the remote UE and the network, the relay UE may need to enter the RRC_connected state and to be granted by the eNB.

Next, the candidate relay UE transmits a relay discovery signal to the remote UE (S152). This may be referred to as a step 2: relay discovery assisted by network.

In step 2, if the remote UE is located out-of-coverage of a cell, the remote UE evaluates candidate relay UEs. If the remote UE is located in-coverage of the cell, selecting of a relay UE from the candidate relay UEs may be performed by a serving cell of the remote UE on the basis of a measurement report received from the remote UE or the candidate relay UEs. Herein, it is assumed that the remote UE is located out-of-coverage of the cell, and selecting of the relay UE is performed by the remote UE.

For a selection criterion of the relay UE, a connectivity of the candidate relay UE (e.g., APN information) and parameters for a measurement result (e.g., RSRP/RSRQ of a sidelink) may be used. A criterion of selecting the relay UE by the remote UE includes an upper layer criterion and a lower layer criterion, which will be described below in detail. For the remote UE located in-coverage of a cell, the eNB may be configured such that the relay discovery is initiated by the remote UE.

When the remote UE selects a specific candidate relay UE as the relay UE, a one-to-one sidelink for a relay is established between the specific candidate relay UE and the remote UE (S153). This may be referred to as a step 3: layer-2 link establishment through PC5 interface.

In step 3, a unicast connection is established between the remote UE and the relay UE through the PC5 interface. This process may include an authentication and security setup process. A security aspect of this process may be handled by SA3. Accordingly, this may be referred to as a step 3: security layer-2 link establishment through PC5 interface.

From an RAN aspect, the following four cases may exist as to mobility of the remote UE.

Case 1: When an intra-cell remote UE establishes a connection with a relay UE.

An intra-E-UTRAN access mobility support in an ECM_connected state for UEs may include a handover process and a dual connectivity related process. In the handover process, a decision/command for allowing a UE to use a radio resource provided by a target eNB is provided by a source eNB. Similarly, in the dual connectivity related process, a decision/command for allowing the UE to use a radio resource provided by a secondary eNB (SeNB) is provided by a master eNB (MeNB).

Inter-RAT mobility is controlled by a network, and this control is performed by the source eNB. That is, a decision/command for allowing the UE to use a radio resource of a target RAT is performed by the source eNB.

Therefore, mobility for a UE in an RRC_connected state is based on a handover depending on a network control under the assistance of the UE. An eNB may control this by using a combination of system information and a dedicated message (RRC connection reconfiguration).

A relay UE for relaying transmission from the remote UE to the network may be regarded as another target from a perspective of the remote UE. The source eNB may decide to use a relay UE for performing an inter-RAT handover on the remote UE in the RRC_connected state or for performing a relay from the remote UE to the network, and the source eNB may require a measurement result for this decision.

A UE located in-coverage of a cell may be in an RRC_idle state or an RRC_connected state according to an activation level of the UE. If the UE is in the RRC_connected state, data can be transmitted/received while maintaining service continuity without a data loss through a handover under the control of the network. In this aspect, the remote UE in the RRC_connected state may be connected to the relay UE under the control of the network. Since the UE in the RRC_connected state does not transmit/receive data, it may be unnecessary to establish a connection with the relay UE. Accordingly, the UE in the RRC_idle state may need to first enter the RRC_connected state.

When selecting the relay UE located in-coverage of the cell, the eNB may involve in the control in various manners. A level at which the eNB involves in the control may be divided into levels 0, 1, 2, and 3.

Level 0: The remote UE may select the relay UE according to an implementation of the remote UE. If data is no longer transmitted in a Uu interface between the eNB and the UE, an inactive timer releases the remote UE.

Level 1: The remote UE may select the relay UE on the basis of parameters included in system information provided from the eNB. If data is no longer transmitted in a Uu interface between the eNB and the UE, an inactive timer releases the remote UE.

Level 2: The remote UE may select the relay UE on the basis of parameters included in a dedicated signal provided from the eNB. If data is no longer transmitted in a Uu interface between the eNB and the UE, an inactive timer releases the remote UE.

Level 3: The remote UE reports to the eNB a measurement result for a candidate relay UE which satisfies a minimum condition. The eNB selects the relay UE from the candidate relay UEs, and hands over the remote UE to the selected relay UE. The handover may be instructed by using an RRC connection reconfiguration message or an RRC release message.

According to the level 3, since the relay UE is selected by the eNB, there is an advantage in that maximum flexibility and consistency with the conventional operation can be maintained to the maximum extent possible.

The minimum criterion may include that: 1) connectivity provided by the relay UE shall satisfy a requirement provided by an upper layer; and 2) a quality of sidelink measurement (e.g., sidelink RSRQ) performed by the remote UE by measuring a discovery signal received from the relay UE shall be greater than or equal to a determined threshold.

Case 2: When a remote UE connected to a relay UE selects and connects a different relay UE.

In this case, the remote UE may be a UE located out-of-coverage of the cell. The remote UE may perform a relay UE reselection process. The relay UE reselection process may include the following three steps.

1. A group of relay UEs (this is referred to as a candidate group) satisfying a minimum condition is maintained. Herein, the minimum condition may be a condition in which a connectivity and sidelink measurement value exceeds a specific threshold. For this, the remote UE may use a discovery operation.

2. If the currently connected relay UE does not satisfy the minimum condition, a reselection process for selecting a different relay UE by excluding the currently connected relay UE in the candidate group is triggered. A timer and/or a hysteresis may be used before excluding the currently connected relay UE from the candidate group.

3. Relay UE reselection may be performed on the basis of any one of the following methods.

a. A remote UE assigns a ranking to candidate relay UEs included in a candidate group to select a candidate relay UE having a highest ranking as a relay UE. The ranking may be assigned on the basis of a sidelink RSRP measurement value between each candidate relay UE and the remote UE.

b. The remote UE may select a candidate relay UE randomly selected from candidate relay UEs included in the candidate group as the relay UE.

c. The remote UE selects the relay UE from the candidate relay UEs included in the candidate group on the basis of a UE implementation. That is, the remote UE selects the relay UE according to an implementation method of the remote UE.

Parameters used in a minimum condition for determining the candidate relay UE included in the candidate group may be preconfigured or may be configured by a network. Among the aforementioned methods a, b, and c, the method a, that is, the methods of assigning rankings to the candidate relay UEs, has an advantage in that a parameter used for assigning rankings can be preconfigured or can be controlled by the network. Which method will be used from the aforementioned methods a, b, and c may be configured by the network or may be predetermined.

Case 3: When a remote UE connected to a relay UE enters into coverage of a cell.

In this case, the remote UE performs cell selection for selecting an E-UTRAN cell. According to an EMM state, the UE may trigger an RRC connection establishment procedure. For example, the RRC connection establishment procedure may be triggered to update a tracking area (TA).

When the remote UE connected to the relay UE enters into coverage of a cell of a specific eNB from outside the coverage of the cell, upon detecting this, the remote UE changes from a state of receiving a service by means of the relay UE to a state of receiving a service from the specific eNB.

Case 4: When a remote UE located out-of-coverage of a cell is connected to a relay UE.

In this case, the remote UE may perform an initial relay UE selection process including the following two steps.

1. A group of relay UEs satisfying a minimum condition (e.g., a connectivity and sidelink measurement value exceeds a specific threshold) is generated (such a group is referred to as a candidate group). For this, the remote UE may use a sidelink discovery operation, that is, a procedure in which the remote UE attempts to receive a sidelink discovery signal transmitted by the relay UE.

2. The relay UE is selected. The relay UE selection process may be based on any one of the following methods.

a. A remote UE assigns a ranking to candidate relay UEs included in a candidate group to select a candidate relay UE having a highest ranking as a relay UE. The ranking may be assigned on the basis of a sidelink RSRP (e.g., SD-RSRP) measurement value between each candidate relay UE and the remote UE.

b. The remote UE may select a candidate relay UE randomly selected from candidate relay UEs included in the candidate group as the relay UE.

c. The remote UE selects the relay UE from the candidate relay UEs included in the candidate group on the basis of a UE implementation. That is, the remote UE selects the relay UE according to an implementation method of the remote UE.

Parameters used in a minimum condition for determining the candidate relay UE included in the candidate group may be preconfigured or may be configured by a network. Among the aforementioned methods a, b, and c, the method a, that is, the methods of assigning rankings to the candidate relay UEs, has an advantage in that a parameter used for assigning rankings can be preconfigured or can be controlled by the network. Which method will be used from the aforementioned methods a, b, and c may be configured by the network or may be predetermined.

The remote UE may start a procedure of selecting the relay UE when the following condition is satisfied. Herein, the relay UE implies a UE which plays a role of a relay between the remote UE and the network.

When the remote UE acquires a list of candidate relay UEs satisfying an upper layer criterion by monitoring a relay discovery signal and acquires a list of candidate relay UEs satisfying a lower layer criterion, the remote UE may start a procedure of selecting a relay UE. The relay discovery signal may be a discovery signal transmitted by a specific UE for the purpose of providing a relay operation.

As described above, the relay UE may relay communication between a network (e.g., eNB) and the remote UE. The present invention proposes a method of releasing a pre-selected relay UE, that is, a method of releasing a link between the remote UE and the relay UE. In addition, a method of selecting the relay UE under the control of the network is proposed. In addition, a method of reporting an amount of sidelink traffic is proposed.

The method of releasing the link between the remote UE and the relay UE may be classified as follows according to an entity of link release triggering.

First, an eNB may instruct a relay UE to release a connection between the relay UE and the remote UE. A sidelink between the relay UE and the remote UE is referred to as a relay link. The eNB may report, to the relay UE, an ID of the remote UE related to a relay link to be released. In addition, the eNB may report, to the remote UE, candidate relay UEs that can be considered in new relay UE selection/reselection. The eNB may report that there is a need for UE reselection triggering by means of a specific remote UE. In this case, the ID of the specific remote UE may be indicated by the eNB.

The eNB may report that triggering of the relay UE selection/reselection is necessary by means of all remote UEs connected to the relay UE.

Second, the eNB may instruct the remote UE to release the connection between the relay UE and the remote UE. The eNB may report candidate relay UEs that can be considered in the new relay UE selection/reselection to the remote UE. The eNB may report that triggering of the relay UE reselection is necessary. The eNB may report that triggering of the relay UE selection/reselection is necessary by means of all remote UEs connected to the relay UE.

Third, the relay UE may instruct the remote UE to release the connection between the relay UE and the remote UE. The eNB may report candidate relay UEs that can be considered in the new relay UE selection/reselection to the remote UE. The relay UE may report that triggering of the relay UE reselection is necessary. The relay UE may report that triggering of the relay UE selection/reselection is necessary by means of all remote UEs connected to the relay UE.

Finally, the remote UE may trigger the relay link release. The remote UE may request/instruct the relay UE to release the connection, or may request the eNB to perform a process for releasing the relay link.

If a command for requesting for the release of a connection with a current relay UE is received or if it is determined to select a new relay UE due to deterioration in a quality of a relay service provided by the current relay UE or if it is determined that the quality of the relay service provided by the current relay UE has a problem, the remote UE does not consider the current relay UE as a candidate UE for the relay UE selection. That is, the current relay UE is excluded from candidate UEs for the relay UE selection.

As such, the following content may be considered as a condition or method for excluding the current relay UE from the candidate relay UE.

1) It may be explicitly indicated that the current relay UE will be excluded according to a relay link release command. The relay link release command may be provided by the network or the relay UE.

2) Upon receiving a relay link release command not explicitly indicating that the current relay UE will be excluded, the remote UE may exclude the current relay UE from the candidate relay UE. For example, if information indicating an ID of a different UE other than the current relay UE is included in the relay link release command, the remote UE autonomously excludes the current relay UE from the candidate relay UE.

For another example, when a message for triggering relay UE reselection is included in the relay link release command, the remote UE autonomously excludes the current relay UE from the candidate relay UE.

Meanwhile, a time at which the current relay UE is excluded from the candidate relay UE may be defined. The eNB may report a time duration in which the remote UE excludes the current relay UE from the candidate relay UE. In this case, the remote UE may exclude the current relay UE from the candidate relay UE from when a message including a time duration value is received from the eNB. Alternatively, upon receiving a message indicating the release of the relay UE, the remote UE may autonomously exclude the relay UE from the candidate relay UE in a specific time duration. That is, the relay UE may be excluded from the candidate relay UE in a time duration determined in a UE specific manner.

Figure 16:
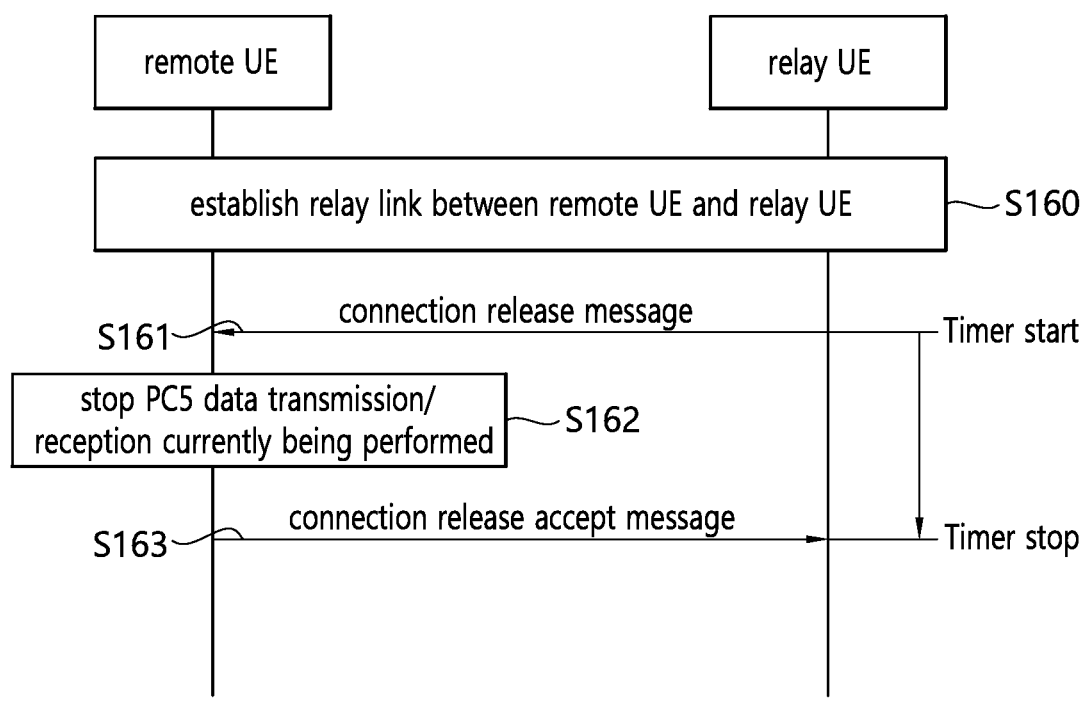
FIG. 16 exemplifies a method of releasing a relay link of a remote UE.

FIG. 16 exemplifies a method of releasing a relay link of a remote UE.

Referring to FIG. 16, it is a state where the relay link is established between the remote UE and a relay UE (S160). In this case, for various reasons, the relay UE may transmit a direct connection release message (this is referred to as 'DIRECT_COMMUNICATION_RELEASE') indicating the release of the relay link to the remote UE (S161). A message for managing such as a sidelink may be transmitted by using a PC5 signaling protocol.

The relay UE may start a connection release process upon receiving a relay link release with respect to the remote UE from an upper layer of the relay UE. That is, a connection release message is generated.

In this case, the connection release message may include a cause value indicating a cause of a connection release, and the cause value may include any one of values of the following table.

TABLE 2

| Cause value | Meaning |
|---|---|
| #1 | Direct communication with remote UE is no longer necessary |
| #2 | Direct communication with remote UE is no longer allowed |
| #3 | Direct communication is no longer available |

The relay UE generates a connection release message, and thereafter transmits the message by delivering it to a lower layer.

Upon receiving the connection release message, the remote UE stops a running timer, and stops relay data transmission/reception with respect to the relay UE (S162). The remote UE stops the relay data transmission/reception, but maintains a PC5 signaling protocol for transmission of a response for the connection release message.

If the cause value included in the connection release message indicates "direct communication with remote UE is no longer allowed" (cause value #2), the remote UE does not attempt to start a direct link setup for the relay UE during at least a specific time T. For example, the remote UE may not perform the link setup attempt for the relay UE by excluding the relay UE which has transmitted the connection release message from a candidate relay UE during the specific time. The time T may be set by the network or the relay UE, or may be a predetermined value or a value determined by the remote UE. The specific time T may be a time duration determined in a UE-specific manner. In other words, it may be a value determined according to a UE implementation, and in this aspect, may be regarded as a value autonomously determined by the UE. Since the remote UE does not attempt to start the direct link setup for the relay UE during at least the specific time T, a ping pong phenomenon can be prevented from occurring. That is, it is possible to prevent the ping pong phenomenon in which, for example, the relay UE is changed from a first relay UE to a second relay UE, and then the relay UE is changed again from the second relay UE to the first relay UE.

The remote UE transmits to the relay UE a direct connection release accept message (this may be referred to as 'DIRECT_COMMUNICATION_RELEASE_ACCEPT') (S163). After transmitting the connection release accept message, the remote UE removes a context related to a link with the relay UE, and does not transmit/receive any message by using a PC5 signaling protocol message through this link. This means that the remote UE discards a MAC PDU in which a UE ID of the relay UE is included as a source ID, instead of delivering it to an upper layer when the MAC PDU is received through a sidelink.

The relay UE may start a timer while transmitting the connection release message, and if the connection release accept message is not received until the timer expires, may repeat a process of restarting the timer by a predefined maximum number of times while retransmitting the connection release message.

If there is no response from the remote UE until it reaches the predetermined maximum number of times, the relay UE releases a direct link for the remote UE and does no longer transmit/receive any message through this link. The maximum number of times may be determined according to the UE.

Meanwhile, although an example in which the relay UE starts a relay link release is described in FIG. 16, the present invention is not limited thereto. That is, the relay link release may be started by the remote UE, and in this case, the remote UE may transmit the connection release message to the relay UE. In addition, the relay UE may transmit the connection release accept message to the remote UE.

Figure 17:
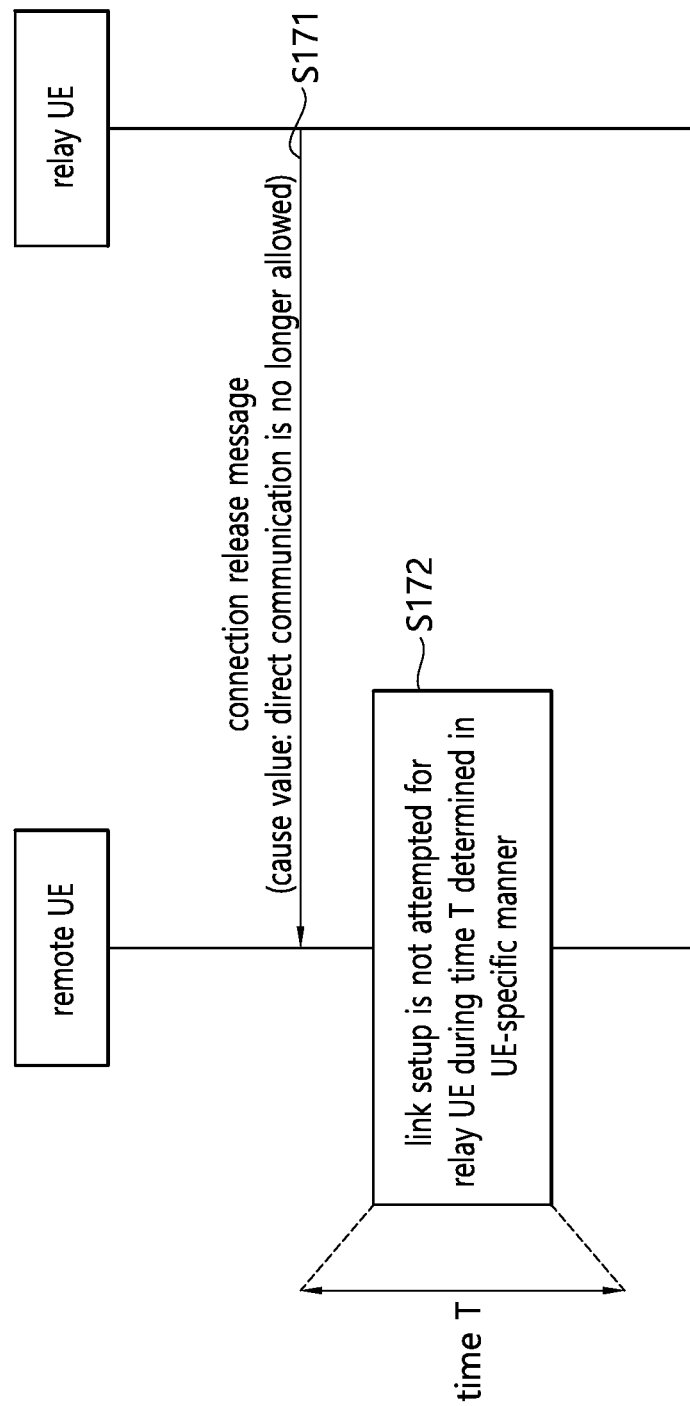
FIG. 17 exemplifies a method of operating a remote UE in a relay link release process in greater detail.

FIG. 17 exemplifies a method of operating a remote UE in a relay link release process in greater detail.

Referring to FIG. 17, the relay UE transmits a connection release message to the remote UE (S171). In this case, a cause value included in the connection release message may indicate that "direct communication with the remote UE is no longer allowed".

In this case, the remote UE may not attempt a link setup for the relay UE during a time T (S172). The time T may be set by a network or the relay UE, and may be a predetermined value or a value defined by the remote UE.

Meanwhile, the relay UE starts a timer if the cause value included in the connection release message is "direct communication with the remote UE is no longer allowed", and retransmits the connection release message by a specific number of times if a connection release accept message is not received before the timer expires. On the other hand, if the cause value included in the connection release message is "direct connection is no longer available", a relay link may be immediately released without having to start the timer.

Figure 18:
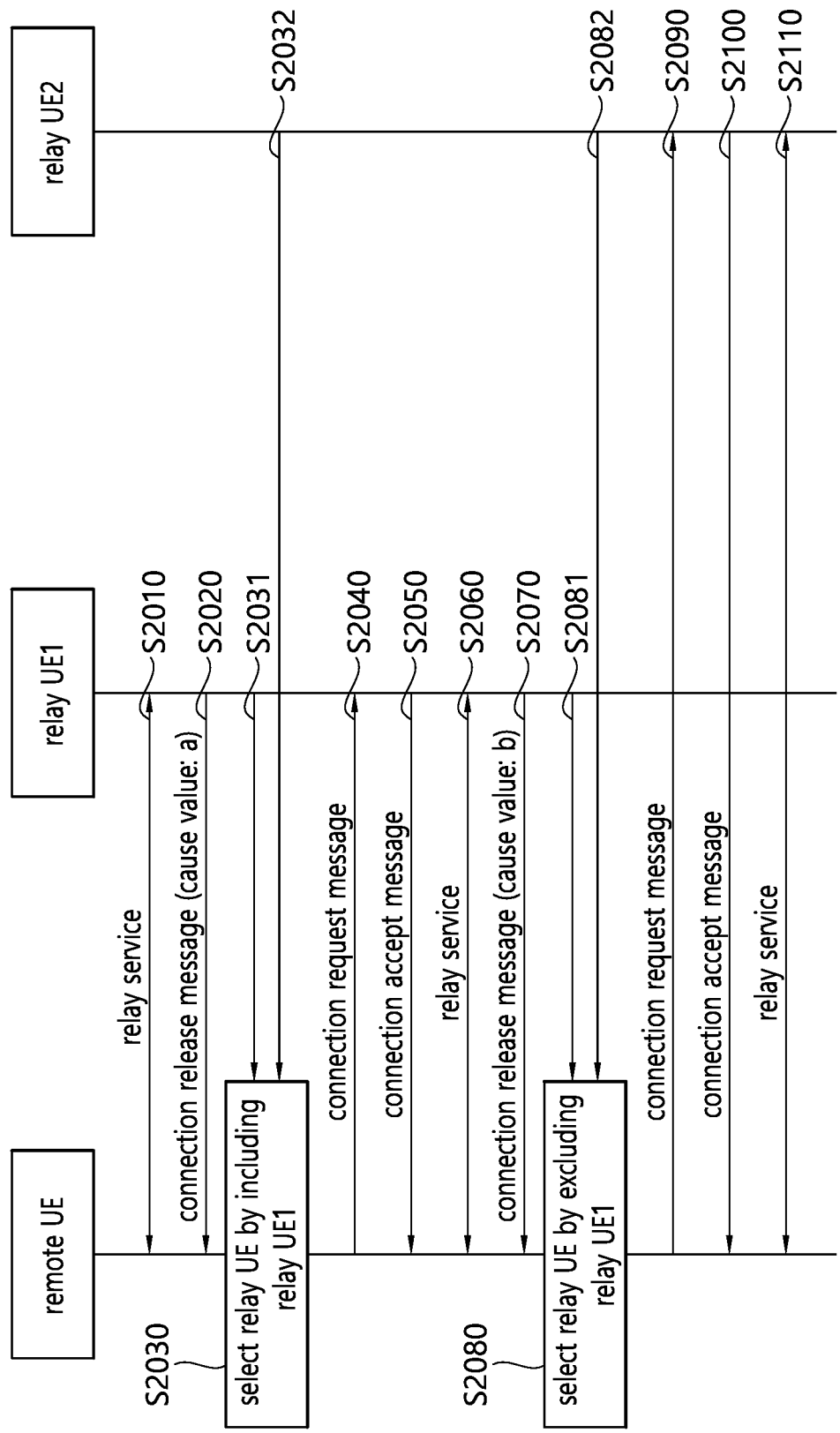
FIG. 18 exemplifies a method of operating a remote UE according to a type of a connection release message.

FIG. 18 exemplifies a method of operating a remote UE according to a type of a connection release message. That is, the remote UE for performing a different operation according to a cause value included in the connection release message is exemplified in FIG. 18.

Referring to FIG. 18, while receiving a relay service (relay service) from a relay UE 1 (S2010), the remote UE may receive the connection release message (S2020). The connection release message may have a value 'a' as the cause value.

In this case, the remote UE may receive signals from the relay UEs 1 and 2 (S2031, S2032), and may select the relay UE in a state where the relay UE 1 is included in a candidate relay UE (S2030).

If the relay UE 1 is selected as the relay UE, the remote UE transmits a connection request message to the relay UE 1 (S2040), receives a connection accept message (S2050), and thereafter receives a relay service from the relay UE 1 (S2060).

The remote UE may receive again the connection release message from the relay UE 1 (S2070). In this case, the connection release message may have a value 'b' as the cause value. In this case, the remote UE may receive signals from the relay UEs 1 and 2 (S2081, S2082), and may select the relay UE in a state where the relay UE 1 is excluded from the candidate relay UE (S2080).

If the relay UE 2 is selected as the relay UE, the remote UE transmits a connection request message to the relay UE 2 (S2090), receives a connection accept message (S2100), and thereafter receives a relay service from the relay UE 2 (S2110). The cause values a and b may be one of values of Table 2, or may be other different values. For example, the cause value a may be a value capable of indicating an operation for including a UE which has transmitted the connection release message when the relay UE is selected, and the cause value b may be a value capable of indicating an operation for excluding the UE which has transmitted the connection release message when the relay UE is selected.

Meanwhile, if a command for requesting for the release of a connection with a current relay UE is received or if it is determined to select a new relay UE due to deterioration in quality of a relay service provided by the current relay UE or if it is determined that the quality of the relay service provided by the current relay UE has a problem, the remote UE may apply a bias to the current relay UE. Herein, the bias may be a value for decreasing a probability that the current relay UE is selected again in a relay UE selection/reselection process. When the applying of the bias is applied to the current relay UE, a probability that the current relay UE is continuously selected is decreased, and a probability that another relay UE is selected as a new relay UE is increased. When the bias is applied, as a result, the current relay UE may be excluded from a candidate relay UE. A method of applying the bias includes a method of performing the procedure of selecting/reselecting the relay UE from other candidate relay UEs by excluding the current relay UE from the candidate relay UE.

For example, the remote UE may select the relay UE on the basis of a quality in a link between the relay UE and an eNB and/or a sidelink between the relay UE and the remote UE. In this case, the remote UE may apply a negative value as a bias for a link related to the current relay UE, and thus may regard that a quality of a link between the current relay UE and the eNB or between the current relay UE and the remote UE is not good.

Regarding the bias, the remote UE may autonomously apply the bias by regarding that: 1) the bias is applied directly by a relay link release command; or 2) the basis is applied when the relay link release command includes information indicating an ID of a different relay UE or a message for triggering relay UE reselection even if the relay connection reject command does not explicitly indicate to apply the bias.

Meanwhile, a time at which the bias is applied may also be defined. The remote UE may receive the time, at which the bias is applied, from directly the eNB or from the relay UE. The eNB may report a time duration in which the current relay UE is excluded from the candidate relay UE to the remote UE located in-coverage. Alternatively, when the eNB designates the time information to the relay UE for the remote UE located out-of-coverage, the relay UE may transmit this information to the remote UE. The remote UE may apply the bias from when a message including a time duration value is received from the eNB. For example, the current relay UE may be excluded from the candidate relay UE.

Alternatively, the UE may autonomously apply the bias to the current relay UE in a specific time duration from when a relay link release message is received.

Meanwhile, although the remote UE requests a first UE to provide the relay service, the request may be rejected. For example, a relay operation of the first UE may be rejected by the network or may be rejected by the decision of the relay UE. In this case, the remote UE may apply a bias to the first UE to decrease a probability that the first UE is selected in a relay UE selection/reselection process performed at a later time. For example, if the remote UE selects the relay UE on the basis of a quality in a link between the relay UE and the eNB and/or a sidelink between the relay UE and the remote UE, the remote UE may apply a negative value as a bias for a link related to the first UE and thus may regard that a quality of a link between the first UE and the eNB or between the first UE and the remote UE is not good, thereby decreasing a probability that the first UE is reselected as the relay UE.

In this aspect, the bias value may be a sort of an offset value. The offset value may be a predetermined or configured value or may be a value signaled by the network. The predetermined or configured value may be applied to out-of-coverage of a cell. If the offset value is signaled by the network, the signaled value may be preferentially applied instead of the predetermined or configured value. If the offset value is configured by the network, the UE may regard that the offset value is valid during a maximum time determined after moving to the out-of-coverage of the cell.

Regarding the bias or the offset, the remote UE may autonomously apply the bias (or offset) by regarding that: 1) the bias is applied directly by a relay connection reject command; or 2) the basis is applied when the relay connection reject command includes information indicating an ID of a different relay UE or a message for triggering a relay UE reselection even if the relay connection reject command does not explicitly indicate to apply the bias.

Meanwhile, a time at which the bias or the offset is applied may also be defined. The eNB may report a time duration in which the remote UE excludes the current relay UE from the candidate relay UE. In this case, the remote UE may exclude the current relay UE from the candidate relay UE from when a message including a time duration value is received from the eNB. Alternatively, the UE may autonomously apply the bias to the current relay UE in a specific time duration from when the relay connection reject command is received.

Meanwhile, even if the UE is excluded from the candidate relay UE in the relay UE selection/reselection process, it may be necessary to include the UE again in the candidate relay UE (or to increase a probability of selecting it or to increase a priority thereof). For example, if the current relay UE is excluded from the candidate relay UE but there is not even one different UE satisfying a relay UE selection/reselection requirement, it may be necessary to include the current relay UE again in the candidate relay UE. That is, the remote UE regards the current relay UE as the candidate relay UE. If the remote UE requests the relay UE which must be excluded from the candidate relay UE to configure a relay service/1:1 link, information (e.g., indicator) indicating such an exceptional situation may be included in a request message. In this case, the relay UE may provide a limited relay service to the remote UE. Herein, the limited relay service is that the relay service is provided only for some of services desired by the remote UE or a limited quality of service (QoS) is provided or the QoS is not ensured for the provided relay service.

Hereinafter, a method of selecting a relay UE under the control of a network is described.

The network may allow the remote UE to select the relay UE by using any one of: 1) a mode in which the remote UE autonomously selects the relay UE; and 2) a mode in which the relay UE is selected under the control of the network.

The network may report which method will be used between the aforementioned two types of relay UE selection methods using an upper layer signal such as an RRC signal.

First, an operation is described for a case where the network is configured to allow the remote UE to autonomously select the relay UE. The network may allow the remote UE to indicate direct setup information through the upper layer signal or may allow the relay UE to relay the setup information. Meanwhile, in order for the network to control a relay UE selection of the remote UE, if information is collected from the remote UE, the information may be directly received from the remote UE or may be received through a relay of the relay UE.

The remote UE may have a criterion for selecting the relay UE. The criterion may be predetermined in the remote UE or may be determined by the network.

If a UE satisfying the aforementioned criterion is found by searching for the UE, the remote UE selects/reselects a corresponding UE as the relay UE.

The remote UE autonomously starts a process for establishing a connection with the relay UE. The process may include a security setup between the remote UE and the relay UE.

The network may report a list of candidate relay UEs to the remote UE. For example, if the candidate relay UEs are identified on the basis of a UE ID, the network may report the UE ID of the candidate relay UEs to the remote UE. The list may be broadcast or may be provided through a dedicated signal. When the list is provided, the remote UE may select the relay UE only from UEs included in the list.

The candidate relay UE may report its ID when a D2D discovery signal is transmitted (announced).

Figure 19:
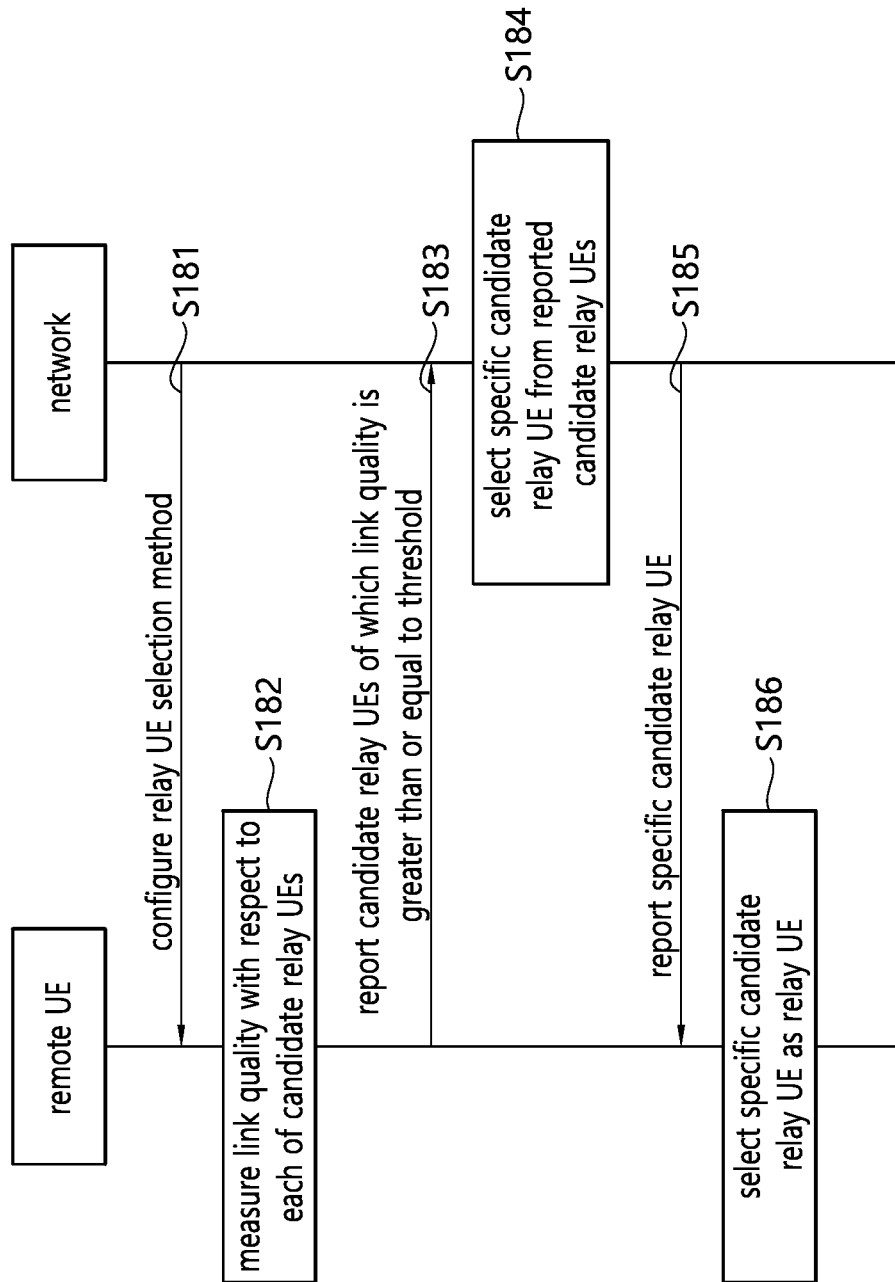
FIG. 19 exemplifies a method of selecting a relay UE under the control of a network.

FIG. 19 exemplifies a method of selecting a relay UE under the control of a network.

Referring to FIG. 19, the network transmits a configuration of a relay UE selection method to a remote UE (S181). It may be reported to the remote UE that the network selects the relay UE for the remote UE. That is, it may be reported to the remote UE that the relay UE is selected under the control of the network.

The remote UE measures a link quality with respect to each of candidate relay UEs (S182), and reports candidate relay UEs of which a link quality is greater than or equal to a threshold to the network (S183).

A measurement report for reporting the candidate relay UEs for a relay service may be configured for the remote UE. The configuration of the measurement report may include a minimum sidelink (relay link) quality threshold. When the threshold is configured, the remote UE may report only candidate relay UEs of which a quality is greater than or equal to the threshold.

When the candidate relay UEs are reported from the remote UE, an eNB selects a specific candidate relay UE from the candidate relay UEs (S184), and reports the specific candidate relay UE to the remote UE (S185). That is, the network may instruct the remote UE to select the specific candidate UE as the relay UE. In this case, the eNB may report an ID of the specific candidate relay UE to the remote UE.

When the eNB instructs the remote UE to select the specific candidate relay UE as the relay UE, a single or a plurality of specific candidate relay UEs may be present. If the number of the specific candidate relay UEs is one, the remote UE performs a connection establishment process for the relay service with respect to the single specific candidate relay UE. The connection establishment process may include a security configuration with respect to the remote UE and the specific candidate relay UE.

Meanwhile, the eNB may provide the remote UE with a list for reporting the plurality of candidate relay UEs. For example, the eNB may report IDs of the plurality of candidate relay UEs to the remote UE. This list may be provided through a dedicated signal for the remote UE. If the list is provided, the remote UE may select the relay UE only from candidate relay UEs included in the list.

The remote UE selects a specific candidate relay UE as the relay UE (S186), and establishes a connection for a relay service. The connection establishment process may include a security setup between the remote UE and the selected candidate relay UE. The candidate relay UEs included in the list may report their IDs when a discovery signal is transmitted.

If it is recognized/detected that the remote UE is located out-of-coverage of a cell on a carrier frequency at which a sidelink operation is performed, the remote UE may change an operation method from a method of selecting the relay UE under the control of the network to a method of selecting the relay UE autonomously by the remote UE. On the contrary, if it is recognized/detected that the remote UE is located in-coverage of the cell on the carrier frequency at which the sidelink operation is performed, the remote UE may change the operation method from the method of selecting the relay UE autonomously by the remote UE to the method of selecting the relay UE under the control of the network.

Meanwhile, a hysteresis may be necessary when the relay UE is reselected. When the remote UE performs the process of selecting the relay UE, the remote UE may apply the hysteresis for a link quality of the current relay UE. This is to prevent the ping pong phenomenon in which, for example, the relay UE is changed from a first relay UE to a second relay UE, and then the relay UE is changed again from the second relay UE to the first relay UE.

If a newly selected candidate relay UE does not show a better link quality greater than or equal to a specific value in comparison with the current relay UE, the remote UE may regard that a reselection criterion is not satisfied for the candidate relay UE.

Meanwhile, the relay UE may provide the relay service between the remote UE and the network. However, the relay UE may perform communication with the network separately from the relay service for the remote UE.

In this case, the relay UE may measure a traffic amount in a sidelink for the relay service and may report this to the network.

Figure 20:
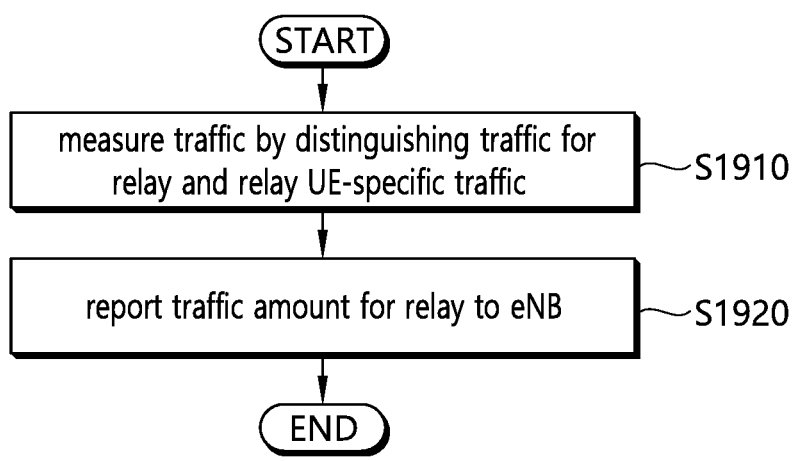
FIG. 20 exemplifies a method of operating a relay UE.

FIG. 20 exemplifies a method of operating a relay UE.

Referring to FIG. 20, the relay UE measures traffic by distinguishing traffic for a relay and relay UE specific traffic (S1910). For example, the relay UE may report a traffic amount by separately measuring/calculating a traffic amount for sidelink transmission for a relay service and a traffic amount for sidelink reception for a relay service.

The relay UE reports the traffic amount for the relay to an eNB (S1920).

The relay UE may accumulatively calculate a size of a PDCP service data unit (SDU) delivered through the sidelink for the relay service. The relay UE may calculate an average traffic amount by dividing an accumulated traffic amount for the sidelink on a time basis.

The relay UE may accumulatively calculate a size of a MAC protocol data unit (PDU) delivered through the sidelink for the relay service. The relay UE may calculate an average traffic amount by dividing an accumulated traffic amount for the sidelink on a time basis.

The relay UE may acquire and add a traffic amount for the relay service for all remote UEs connected to the relay UE, and thereafter may report this to the network.

The relay UE may calculate an accumulated traffic amount or an average traffic amount for each priority of a sidelink logical channel corresponding to a sidelink radio bearer. Herein, the priority of the sidelink logical channel may be a ProSe per packet priority (PPPP) value or a priority value related to the PPPP.

Alternatively, the relay UE may acquire a traffic amount for the relay service for each remote UE connected to the relay UE and may report this to the network. In this case, the relay UE may report together a specific UE for which the traffic amount is reported. For example, the relay UE may report together an ID of a remote UE and a traffic amount for the remote UE. In a handover preparation process for the remote UE, traffic information of the remote UE may be delivered to a target eNB.

The report may be performed periodically or may be performed when a specific event is satisfied. The specific event may be an event in which a measured sidelink traffic amount exceeds a threshold.

In a handover preparation process of the relay UE, traffic information reported by the relay UE may be delivered to the target eNB.

The remote UE may report that it is interested in the relay service. When the remote UE desires to receive the relay service, if the remote UE exists in coverage of a network, the remote UE may report that it is interested in receiving the relay service to the network.

When a message for reporting that it is interested in the relay service is received from the remote UE, the network may provide a relay connection management command with a minimum interruption even if SIB has a transmission resource pool and reception resource pool for a sidelink operation by maintaining the remote UE to an RRC_connected state.

The UE may report a traffic amount by measuring/calculating a sum of a traffic amount for sidelink transmission for a relay service and a traffic amount for sidelink reception for the relay service.

Figure 21:
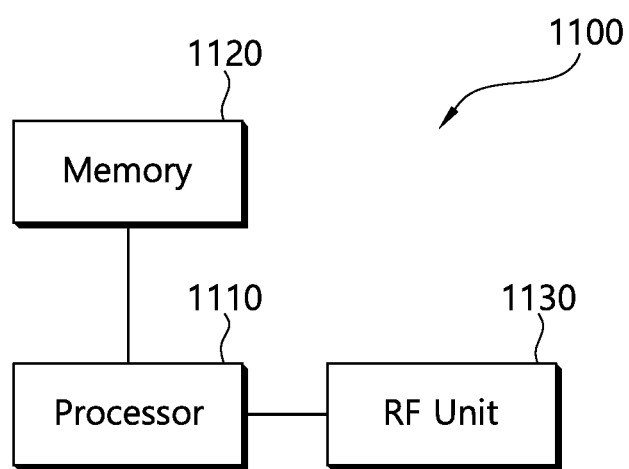
FIG. 21 is a block diagram illustrating a terminal in which an embodiment of the present invention is implemented.

FIG. 21 is a block diagram illustrating a terminal in which an embodiment of the present invention is implemented.

Referring to FIG. 21, a terminal 1100 includes a processor 1100, a memory 1120, and a radio frequency (RF) unit 1130. The processor 1110 implements a function, a process, and/or a method which are proposed. The RF unit 1130 is connected to the processor 1110 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for releasing a link in a wireless communication system, the method performed by a remote user equipment (UE) and comprising:
   receiving a connection release message for releasing a link between a relay UE and the remote UE, wherein the connection release message informs the remote UE of a release reason,
   releasing the link based on the connection release message, and
   triggering a relay reselection based on the connection release message and the release reason,
   wherein based on the release reason being that the link between the remote UE and the relay UE is not allowed, the remote UE does not attempt to establish the link between the relay UE and the remote UE in a time duration, and
   wherein the time duration is autonomously determined by the remote UE.

2. The method of claim 1, wherein in the time duration, the remote UE excludes the relay UE from being a candidate relay UE based on the remote UE triggering the relay reselection.

3. The method of claim 1, wherein a connection release accept message is transmitted to the relay UE in response to the connection release message.

4. The method of claim 1, wherein the link between the relay UE and the remote UE is a sidelink which uses a PC5 interface.

5. A remote user equipment (UE) comprising:
   a transmitter and receiver for transmitting and receiving a radio signal; and
   a processor operatively coupled to the transmitter and receiver, wherein the processor is configured for:
   receiving, via the receiver, a connection release message for releasing a link between a relay UE and the remote UE, wherein the connection release message informs the remote UE of a release reason,
   releasing the link based on the connection release message, and
   triggering a relay reselection based on the connection release message and the release reason,
   wherein based on the release reason being that the link between the remote UE and the relay UE is not allowed, the remote UE does not attempt to establish the link between the relay UE and the remote UE in a time duration, and
   wherein the time duration is autonomously determined by the remote UE.

6. The UE of claim 5, wherein in the time duration, the UE excludes the relay UE from being a candidate relay UE based on the remote UE triggering the relay reselection.

7. The UE of claim 5, wherein a connection release accept message is transmitted to the relay UE in response to the connection release message.

8. The UE of claim 5, wherein the link between the relay UE and the UE is a sidelink which uses a PC5 interface.

* * * * *